(12) United States Patent
Thomas

(10) Patent No.: US 8,820,780 B2
(45) Date of Patent: Sep. 2, 2014

(54) SEAT WITH SIDE AIRBAG GUIDE CHUTE

(71) Applicant: GM Global Technology Operations LLC, Detroit, MI (US)

(72) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/742,758

(22) Filed: Jan. 16, 2013

(65) Prior Publication Data

US 2014/0197621 A1  Jul. 17, 2014

(51) Int. Cl.
*B60R 21/207* (2006.01)

(52) U.S. Cl.
USPC .............. 280/730.2; 280/728.2; 297/216.13

(58) Field of Classification Search
USPC ................ 280/728.2, 730.2, 743.1, 743.2; 297/216.13
See application file for complete search history.

(56) References Cited

U.S. PATENT DOCUMENTS

| | | | |
|---|---|---|---|
| 5,678,853 A * | 10/1997 | Maly | 280/730.2 |
| 5,810,389 A * | 9/1998 | Yamaji et al. | 280/730.2 |
| 5,816,610 A * | 10/1998 | Higashiura et al. | 280/728.3 |
| 5,860,673 A * | 1/1999 | Hasegawa et al. | 280/730.2 |
| 5,863,063 A | 1/1999 | Harrell | |
| 5,927,749 A | 7/1999 | Homier et al. | |
| 5,938,232 A * | 8/1999 | Kalandek et al. | 280/730.2 |
| 5,967,603 A * | 10/1999 | Genders et al. | 297/216.13 |
| 6,045,151 A | 4/2000 | Wu | |
| 6,206,466 B1 * | 3/2001 | Komatsu | 297/216.13 |
| 6,209,906 B1 * | 4/2001 | DeWitt | 280/728.3 |
| 6,357,789 B1 * | 3/2002 | Harada et al. | 280/730.2 |
| 6,382,665 B2 * | 5/2002 | Holdampf et al. | 280/730.2 |
| 7,222,875 B2 | 5/2007 | Meyendorff et al. | |
| 7,290,793 B2 * | 11/2007 | Tracht | 280/730.2 |
| 7,331,601 B2 * | 2/2008 | Tracht | 280/730.2 |
| 7,390,015 B2 * | 6/2008 | Tracht | 280/730.2 |
| 7,669,889 B1 * | 3/2010 | Gorman et al. | 280/730.2 |
| 7,677,594 B2 | 3/2010 | Hazlewood et al. | |
| 8,152,197 B2 | 4/2012 | Taguchi et al. | |
| 8,220,832 B2 * | 7/2012 | Muller | 280/730.2 |
| 8,474,858 B2 * | 7/2013 | Urabe et al. | 280/728.2 |
| 2006/0113764 A1 * | 6/2006 | Tracht | 280/730.2 |

* cited by examiner

*Primary Examiner* — Faye M Fleming
*Assistant Examiner* — Laura Freedman
(74) *Attorney, Agent, or Firm* — Quinn Law Group, PLLC

(57) ABSTRACT

A seat assembly for a vehicle includes a back frame, and a foam cushion assembly positioned adjacent the back frame. A trim cover is secured over the foam cushion assembly. The trim cover includes a first edge and a second edge sewn together to define a tear seam. A side airbag module is attached to the back frame. The side airbag module includes an airbag that is deployable through the tear seam. A guide chute includes a first strap end attached to the trim cover adjacent the tear seam, and a second strap end attached to a component of the seat assembly other than the back frame, such as the foam cushion assembly.

10 Claims, 5 Drawing Sheets

SEAT WITH SIDE AIRBAG GUIDE CHUTE

TECHNICAL FIELD

The invention generally relates to a seat assembly for a vehicle, and more specifically to a guide chute for a side airbag module of the seat assembly.

BACKGROUND

Some vehicular seat assemblies include side impact airbag modules incorporated into the seat assembly. Such a seat assembly will typically include a back frame that supports a foam cushion structure and the airbag module. A flexible trim cover encases the back frame, the foam cushion structure and the airbag module. The trim cover typically defines a tear seam through which the side impact airbag will deploy. Often, the seat assembly will include an airbag guide chute for controlling and guiding the deployment of the airbag through the tear seam in order to provide consistent performance.

SUMMARY

A seat assembly for a vehicle is provided. The seat assembly includes a back frame, and a foam cushion assembly positioned adjacent the back frame. A trim cover is secured over the foam cushion assembly. The trim cover includes a first edge and a second edge sewn together to define a tear seam. A side airbag module is attached to the back frame. The side airbag module includes an airbag that is deployable through the tear seam. A guide chute includes a first strap end attached to the trim cover adjacent the tear seam, and a second strap end attached to the foam cushion assembly.

Accordingly, the guide chute secures the tear seam relative to the foam cushion assembly to limit movement of the tear seam and control the deployment of the airbag through the tear seam. Because the guide chute does not directly attach to the back frame, the guide chute does not wrap around and/or encircle the airbag module, thereby improving manufacturing efficiency and installation sequencing problems related to the installation of the airbag module.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a seat assembly is generally shown at 20. The seat assembly 20 is for a vehicle, and is shown as a front seat for the vehicle.

Figure 1:
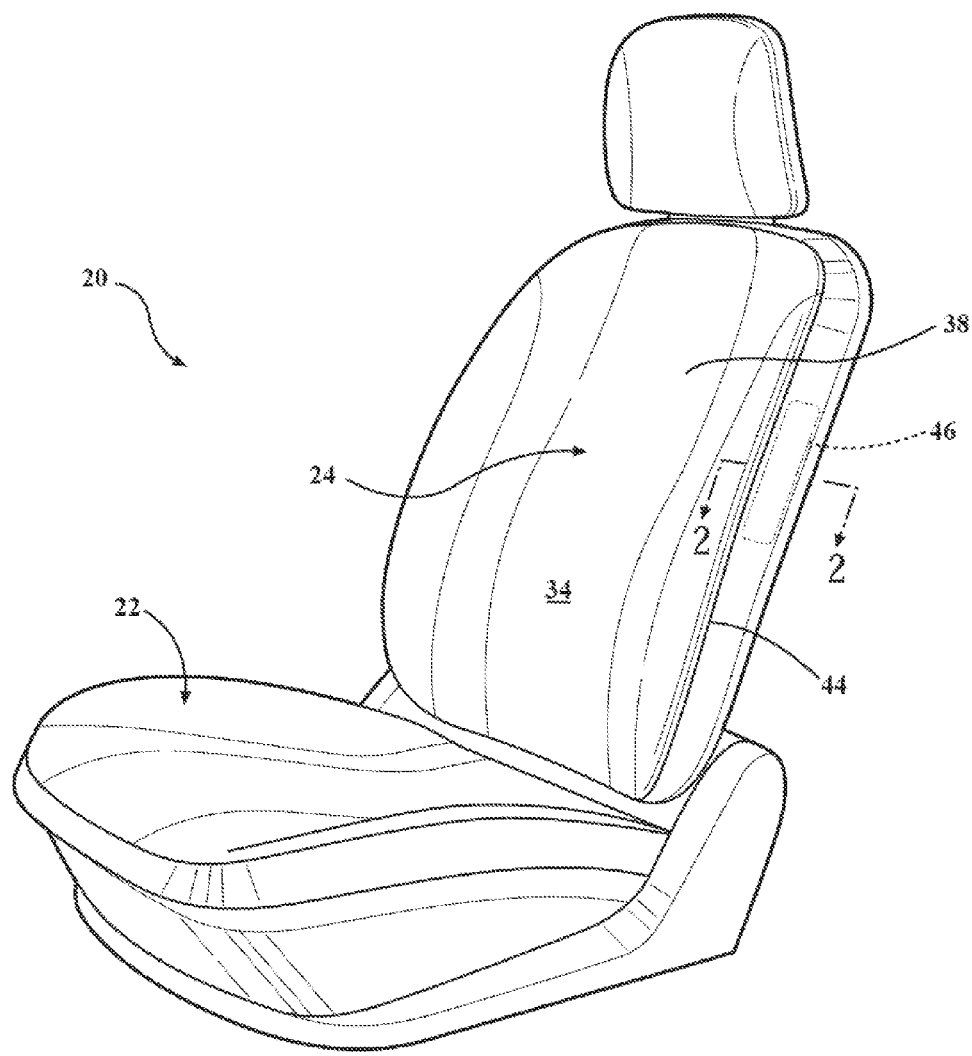
FIG. 1 is a schematic perspective view of a seat assembly.
Figure 2:
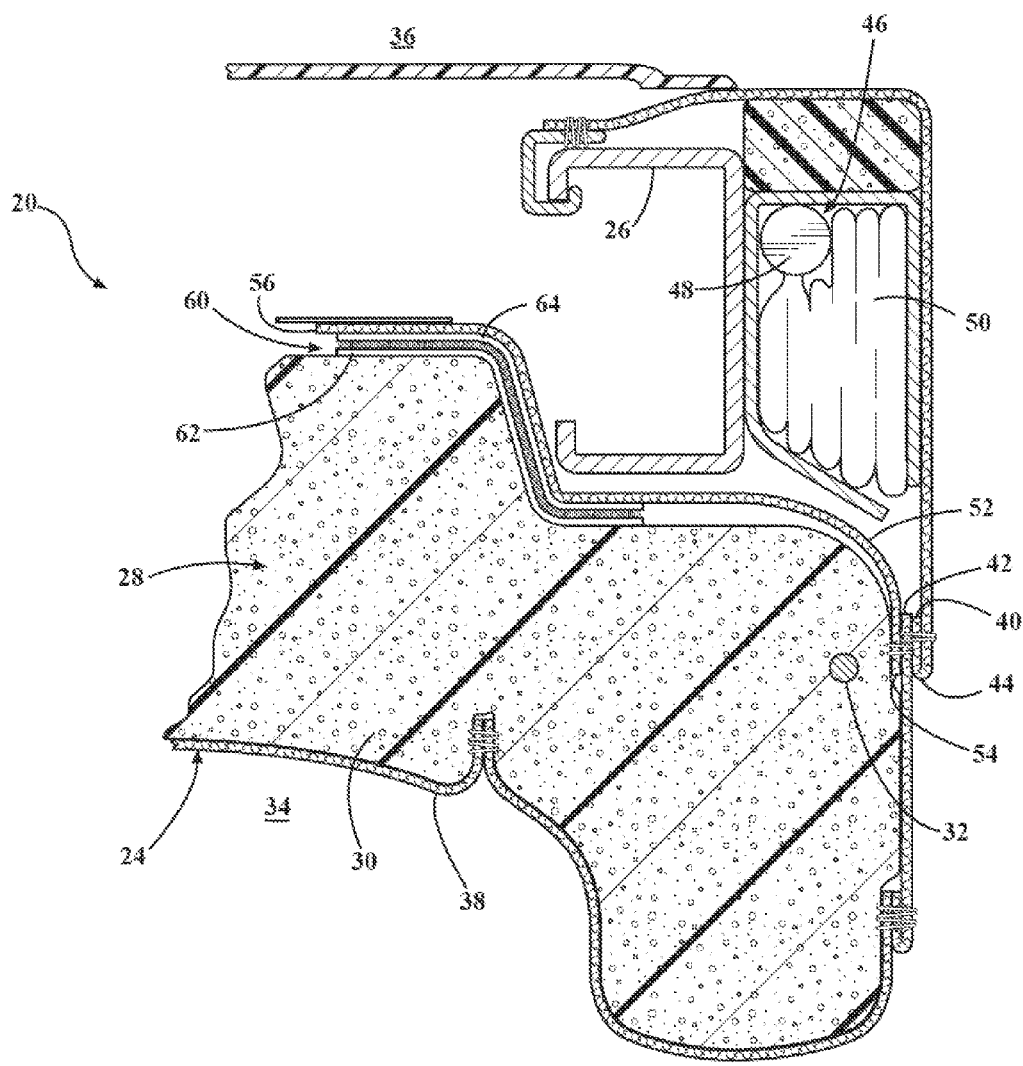
FIG. 2 is a partial schematic cross sectional view of the seat assembly taken along cut line 2-2 shown in FIG. 1.

The seat assembly 20 includes a seat bottom 22 and an attached seat back 24. Referring to FIG. 2, the seat back 24 includes a back frame 26, and a foam cushion assembly 28 positioned adjacent the back frame 26. The foam cushion assembly 28 includes a foam pad 30, and as an option, at least one wire rod 32 disposed within the foam pad 30 to provide support for the foam pad 30. The wire rod 32 typically routes in the foam pad 30 along the left and right sides of the seat back 24, and can route laterally across the foam pad 30 at the top of the seat back 24, the bottom of the seat back 24, or both. The foam pad 30 defines a forward facing or occupant side 34, a rearward facing or non-occupant side 36. It should be appreciated that when seated in the seat assembly 20, an occupant is seated against the occupant side 34 of the foam pad 30.

A trim cover 38 is secured to the foam cushion assembly 28, and surrounds the foam cushion assembly 28 and the back frame 26. Various methods, not shown or described in detail herein, may be used to attach the trim cover 38 to the cushion assembly 28. These methods may consist of, but are not limited to, a hook and loop attachment, a hog ring from the trim selvedge to molded in rods in the seat trim cover 38, plastic loops attached to rods wherein one of the plastic loops and rods is attached to the seat cushion assembly 28 and the other of the plastic loops and rods is attached to the trim cover 38. The trim cover 38 includes a first edge 40 and a second edge 42 that are sewn together to define a tear seam 44. Several different stitch types may be used to sew the tear seam 44 together.

A side airbag module 46 is attached to the back frame 26, and also enclosed by the trim cover 38. The airbag module 46 includes an inflator 48 and an airbag 50 that is deployable through the tear seam 44. As is known, in response to a side impact, the inflator 48 rapidly inflates the airbag 50 such that the air bag expands, causing the first edge 40 and the second edge 42 of the trim cover 38 to separate at the tear seam 44, thereby allowing the airbag 50 to inflate and expand through the tear seam 44, between the first edge 40 and the second edge 42 of the trim cover 38. While the seat assembly 20 only shows a single airbag module 46, it should be appreciated that the seat assembly 20 may include multiple airbag modules 46 and that the trim cover 38 may define multiple tear seams 44. For example, the seat assembly 20 may include an outboard airbag module 46, such as shown in the Figures, and an inboard airbag module 46 (not shown), with an associated tear seam 44 for each, disposed on laterally opposite sides of the seat assembly 20.

The seat assembly 20 further includes a guide chute 52. The guide chute 52 includes a first strap end 54 and a second strap end 56. The first strap end 54 is attached to the trim cover 38 adjacent the tear seam 44. Preferably, the first strap end 54 is sewn to the trim cover 38 adjacent the tear seam 44. However, the first strap end 54 may be attached to the trim cover 38 by some other manner not described herein. The second strap end 56 is attached to a feature of the seat assembly 20 other than the back frame 26, i.e., the second strap end 56 may be attached to any feature of the seat assembly 20 other than the back frame 26. As such, the seat assembly 20 may be characterized by the absence of a direct attachment between the guide chute 52 and the back frame 26.

As shown in FIG. 2, the guide chute 52 is disposed between the airbag module 46 and the non-occupant side 36 of the foam pad 30. Alternatively, referring to FIG. 3, the foam pad 30 defines a slit 58 with the guide chute 52 extending through the slit 58 between the first strap end 54 and the second strap end 56. Accordingly, the guide chute 52 does not wrap around or otherwise encircle the airbag module 46. Furthermore, although not shown in the Figures, it is contemplated that the second strap end 56 of the guide chute 52 may be routed for attachment to the occupant side 34 of the foam pad 30.

Figure 3:
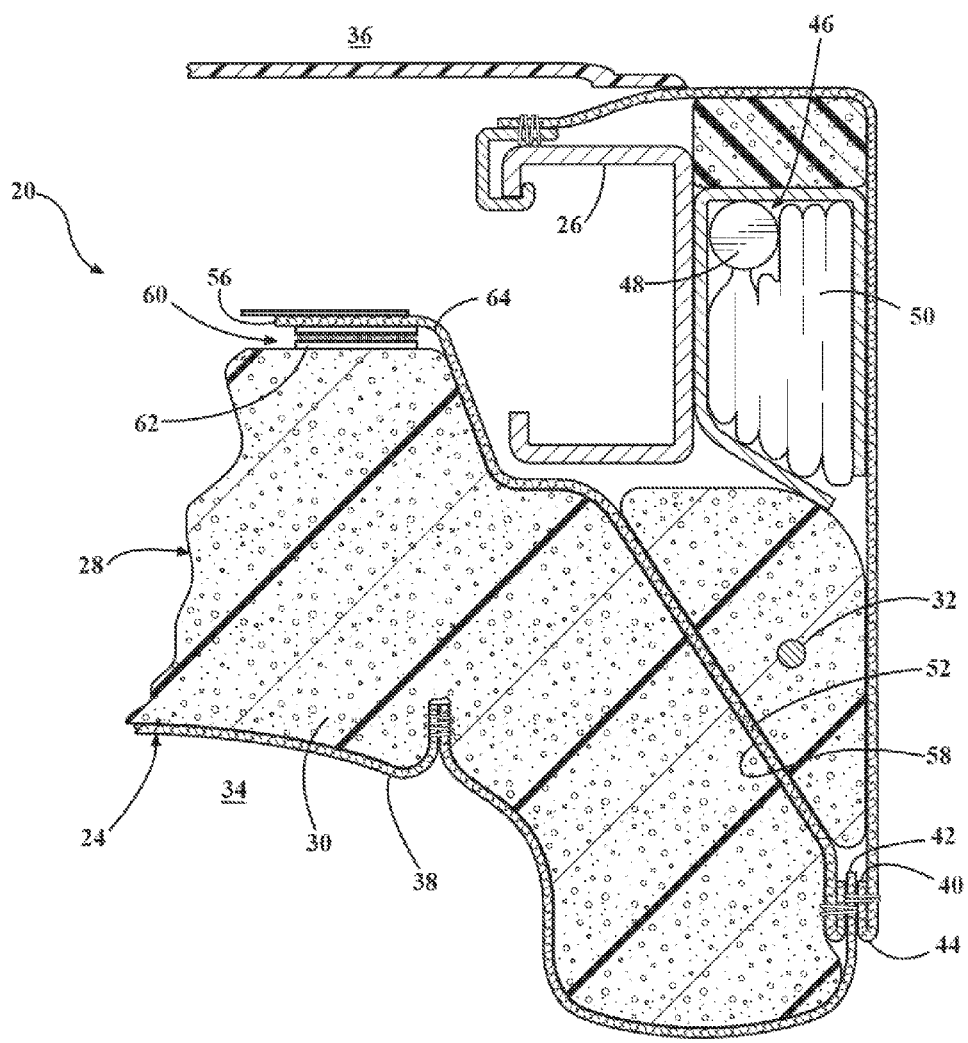
FIG. 3 is a partial schematic cross sectional view of a first alternative embodiment of the seat assembly.

Preferably, and as shown in FIGS. 2 and 3, the second strap end 56 of the guide chute 52 is directly attached to the non-occupant side 36 of the foam pad 30 of the foam cushion assembly 28. The seat assembly 20 may include a mechanical attachment mechanism 60 that interconnects the second strap end 56 of the guide chute 52 and the foam cushion assembly 28. For example, the mechanical attachment mechanism 60 may include, but is not limited to, a hook and loop fastening system. At least a portion of the mechanical attachment mechanism 60 may be molded into the foam pad 30. For example, one side of the hook and loop fastening system, such as a hook side 62, may be molded into the foam pad 30 of the foam cushion assembly 28, and the other side of the hook and loop fastening system, such as a loop side 64, may be attached to the second strap end 56 of the guide chute 52. The guide chute 52 is attached to the foam cushion assembly 28 by securing the hook side 62 of the hook and loop fastening system to the loop side 64 of the hook and loop fastening system.

Figure 4:
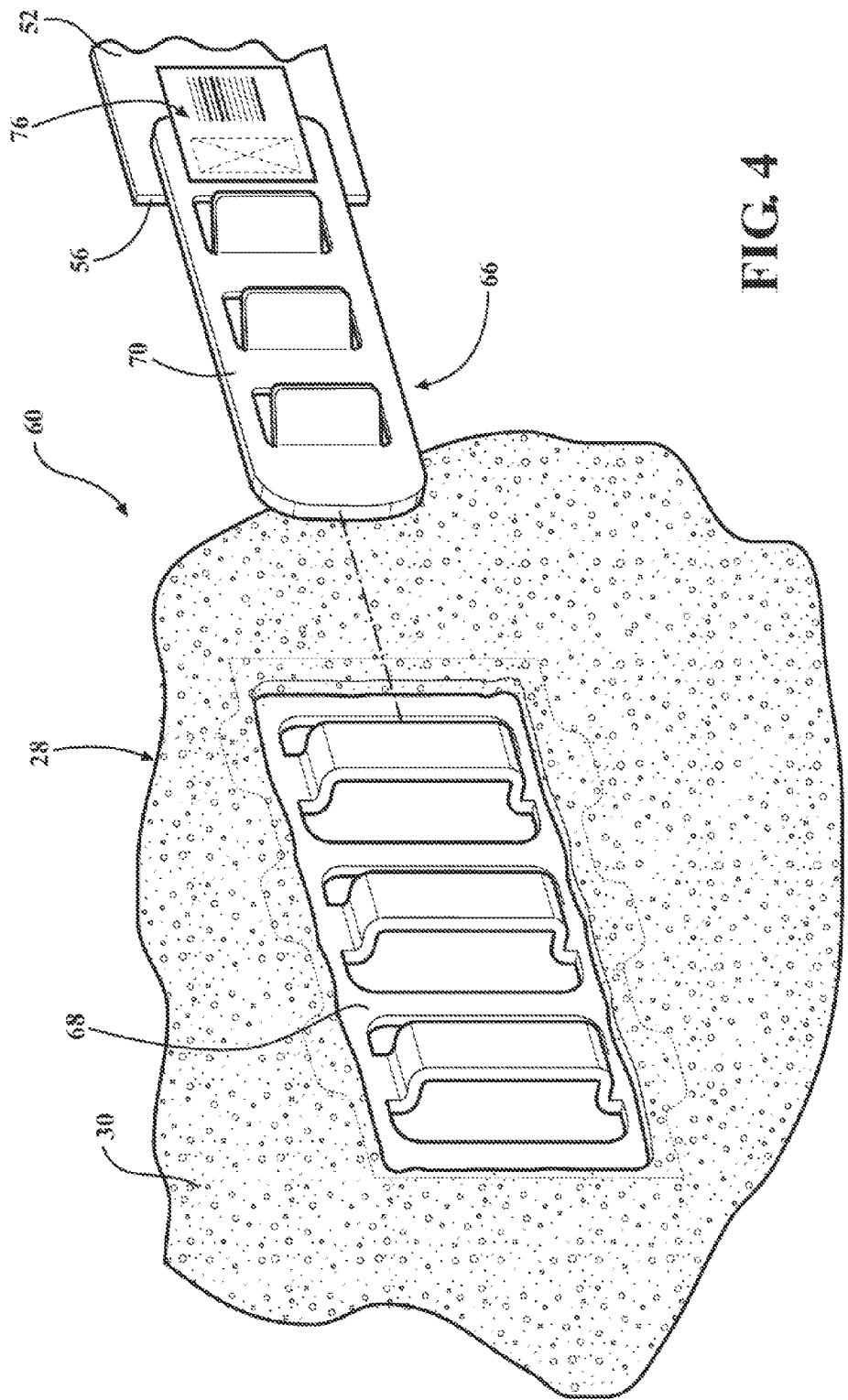
FIG. 4 is a schematic perspective view of a mechanical attachment mechanism.

Alternatively, referring to FIG. 4, the mechanical attachment mechanism 60 may include a clip assembly 66. The clip assembly 66 may include a female clip half 68 attached to one of the foam cushion assembly 28 and the second strap end 56 of the guide chute 52, and a male clip half 70 attached to the other of the foam cushion assembly 28 and the second strap end 56 of the guide chute 52. As noted above, the half of the clip assembly 66 that is attached to the foam cushion assembly 28 may be molded into the foam pad 30. The guide chute 52 is attached to the foam cushion assembly 28 by attaching the male clip half 70 of the clip assembly 66 to the female clip half 68 of the clip assembly 66.

Figure 5:
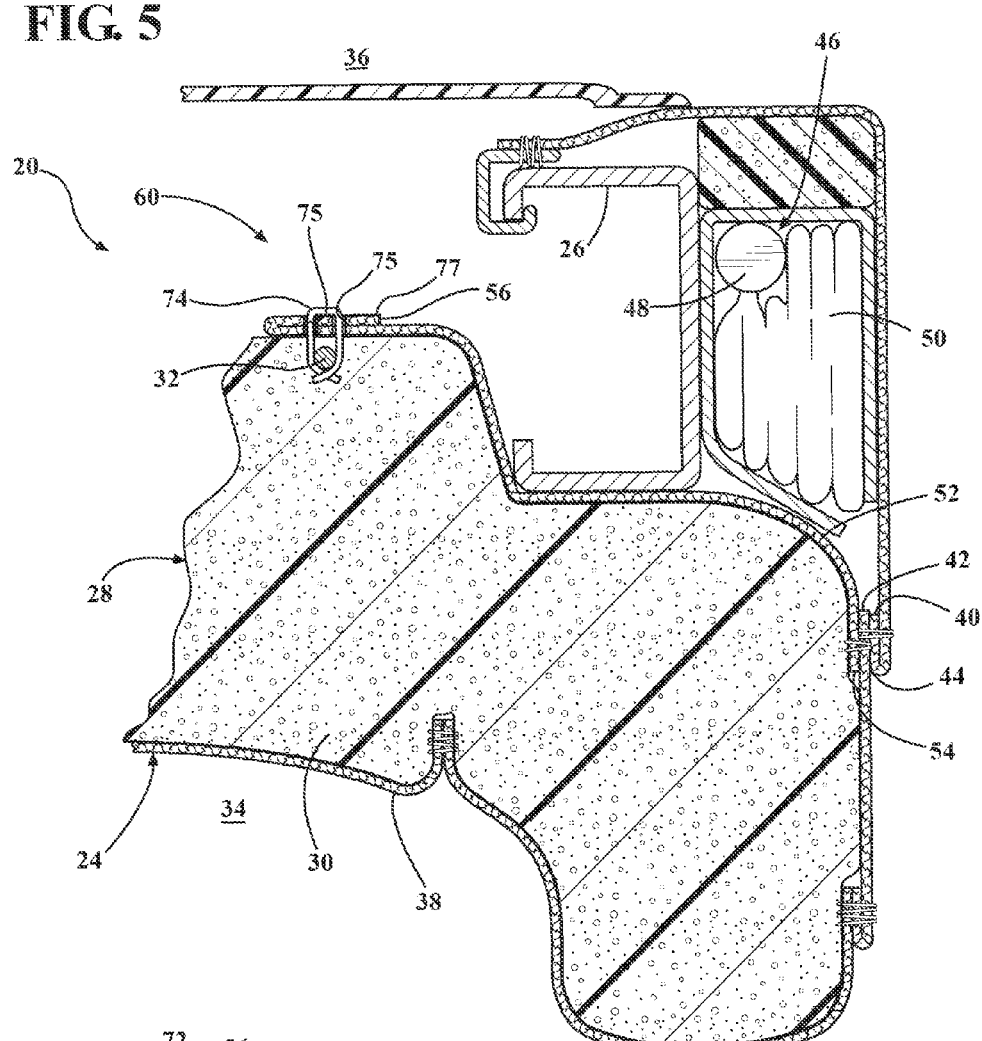
FIG. 5 is a partial schematic cross sectional view of a second alternative embodiment of the seat assembly.
Figure 6:
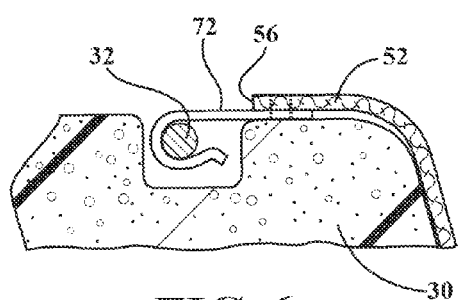
FIG. 6 is a schematic cross sectional view of an alternative embodiment of the mechanical attachment mechanism.

It should be appreciated that the second strap end 56 of the guide chute 52 may be attached to the foam cushion assembly 28 in any suitable fashion. For example, referring to FIG. 5, a wire rod 32 routes through the foam pad 30 and forms a portion of the cushion assembly 28. The second strap end 56 of the guide chute 52 may be attached to the wire rod 32 at a location in the foam pad 30 where the rod is intentionally exposed for this attachment. The wire rod 32 could be placed anywhere in the foam pad 30, but typically routes on the left and right side of the foam pad 30 with a lateral portion extending through the foam pad 30 at the top or bottom of the foam pad 30. If necessary, some bends can be placed in the wire rod 32 to better present its attachment location to the second strap end 56. As shown in FIG. 5, a mechanical attachment, such as a hog ring 74, may be attached to the wire rod 32, with the second strap end 56 of the guide chute 52 secured to the hog ring 74. The second strap end 56 may have one or more holes 75 through which the hog ring 74 is routed, or the hog ring 74 could be forced directly through the material of the guide chute 52 during installation. In addition, for the hog ring 74/guide chute 52 interface, the second strap end 56 may be reinforced with another piece of material or could have a flap 77 folded over that reinforces the interface. Alternatively, as shown in FIG. 6, the second strap end 56 may include a J-hook 72 or other similar device for clasping or grabbing the wire rod 32.

Furthermore, while not specifically shown in the drawings, it should be appreciated that the second strap end 56 of the guide chute 52 may be attached to some other component or feature of the seat assembly 20, other than the back frame 26. For example, if the seat assembly 20 includes opposing lateral side airbag modules 46, the second strap end 56 of each of the guide chutes 52 for reach of the respective airbag 50 modules 46 may be attached to each other. The guide chute 52 may also be attached to a seat suspension component, or an HVAC component.

Referring to FIG. 4, the seat assembly 20 may further include a bar code assembly 76 that is attached to the guide chute 52 to verify proper attachment. Once installed, the bar code assembly 76 may be scanned to verify that the guide chute 52 is properly installed to the cushion assembly 28.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A seat assembly for a vehicle, the seat assembly comprising:
    a back frame;
    a foam cushion assembly positioned adjacent the back frame, and including a foam pad and a wire rod disposed within the foam pad;
    a trim cover secured over the foam cushion assembly and including a first edge and a second edge sewn together to define a tear seam;
    a side airbag module attached to the back frame, and including an airbag that is deployable through the tear seam; and
    a guide chute having a first strap end attached to the trim cover adjacent the tear seam, and a second strap end directly attached to the foam pad of the foam cushion assembly;
    wherein the second strap end of the guide chute is not attached to the wire rod.

2. A seat assembly as set forth in claim 1 characterized by the absence of a direct attachment between the guide chute and the back frame.

3. A seat assembly as set forth in claim 1 wherein the second strap end of the guide chute is attached to a non-occupant side of the foam pad.

4. A seat assembly as set forth in claim 1 wherein the foam pad defines a slit with the guide chute extending through the slit.

5. A seat assembly as set forth in claim 1 wherein the guide chute is disposed between the airbag module and a non-occupant side of the foam pad.

6. A seat assembly as set forth in claim 1 further comprising a mechanical attachment mechanism interconnecting the second strap end of the guide chute and the foam pad of the foam cushion assembly.

7. A seat assembly as set forth in claim 6 wherein the mechanical attachment mechanism includes a hook and loop fastening system.

8. A seat assembly as set forth in claim 6 wherein the mechanical attachment mechanism includes a clip assembly having a female clip half attached to one of the foam pad of the foam cushion assembly and the second strap end of the guide chute, and a male clip half attached to the other of the foam pad of the foam cushion assembly and the second strap end of the guide chute.

9. A seat assembly as set forth in claim 6 wherein at least a portion of the mechanical attachment mechanism is molded into the foam pad.

10. A seat assembly as set forth in claim 1 further comprising a bar code assembly attached to the guide chute.

\* \* \* \* \*